United States Patent
Polka (10) Patent No.: US 6,443,528 B1
(45) Date of Patent: Sep. 3, 2002

(54) APPARATUS FOR ATTACHING A COVER TO A VEHICLE WHEEL HAVING A DROPPED CENTER

(76) Inventor: John G. Polka, 1335 Margate, Libertyville, IL (US) 60048

( * ) Notice: Subject to any disclaimer, the term of this patent is extended or adjusted under 35 U.S.C. 154(b) by 0 days.

(21) Appl. No.: 09/746,386

(22) Filed: Dec. 21, 2000

(51) Int. Cl.⁷ .................................................. B60B 7/00
(52) U.S. Cl. ............................ 301/37.102; 301/37.101
(58) Field of Search ........................ 301/37.101, 37.102, 301/37.31, 37.34, 37.38, 37.37, 108.4

(56) References Cited

U.S. PATENT DOCUMENTS

| | | | |
|---|---|---|---|
| 4,229,047 A | * 10/1980 | Beisch | 301/37.101 |
| 4,231,619 A | * 11/1980 | Beisch et al. | 301/37.101 |
| 4,232,907 A | * 11/1980 | Beisch | 301/37.101 |
| 4,383,716 A | * 5/1983 | Osborn | 301/37.101 |
| 4,470,638 A | 9/1984 | Bartylla | |
| 5,042,881 A | 8/1991 | Polka | |
| 5,061,014 A | 10/1991 | Polka | |
| 5,358,313 A | 10/1994 | Polka | |
| 5,366,279 A | 11/1994 | Polka | |
| 5,630,653 A | 5/1997 | Polka | |
| 5,676,430 A | 10/1997 | Wright et al. | |
| 5,823,635 A | 10/1998 | Polka | |
| 5,876,099 A | 3/1999 | Irgens-Moller et al. | |
| 6,152,537 A | * 11/2000 | Wright et al. | 301/37.31 |
| 6,238,007 B1 | * 5/2001 | Wieczorek et al. | 301/37.31 |
| 6,247,760 B1 | * 7/2001 | Kinoshita | 301/37.34 |

\* cited by examiner

*Primary Examiner*—S. Joseph Morano
*Assistant Examiner*—Long Bao Nguyen
(74) *Attorney, Agent, or Firm*—Robert L. Marsh (57) ABSTRACT

A cover for a vehicle wheel having a drop center is generally complementary in shape to the wheel and has a plurality of connectors spaced around the inside surface thereof. Each connector has a moveable hook and an adjusting bolt. Rotation of the adjusting bolt in one direction extends the hook until it engages the shoulder in the cylindrical portion of the wheel formed by the drop center to thereby retain the cover to the wheel. Rotation of the adjusting bolt in the opposite direction withdraws the hook out of engagement with the shoulder such that the cover can be removed from or reinstalled to the wheel.

11 Claims, 12 Drawing Sheets

APPARATUS FOR ATTACHING A COVER TO A VEHICLE WHEEL HAVING A DROPPED CENTER

The present invention relates to an apparatus for retaining a cover or liner to a wheel where the wheel has a dropped center.

BACKGROUND OF THE INVENTION

The manufacturers of trucks, recreational vehicles, tow trucks, buses and other large vehicles generally do not provide covers for the central portion of the wheels of the vehicles they manufacture. Nonetheless, it has become common in recent years for the owners of large vehicles, even large semi-tractors, to improve the appearance of their respective vehicles by covering the unsightly central portion of the wheel with wheel covers provided by a number of after market manufacturers.

Since large vehicles are not provided with wheel covers by their respective manufacturers, the wheels for such vehicles do not have ridges or clamps to which the wheel cover can be attached and wheel cover manufactures have, therefore, been required to develop products which attach to the functional portions of the wheel. The most common method for installing the wheel covers to such wheels is to provide holes in the cover or holes in an adapter which is attachable to the cover, where the holes are positioned to receive the studs which retain the wheel to the hub of the vehicle. The wheel liner is, therefore, retained to the wheel by the same lug nuts which retain the wheel to the hub.

Certain states, such as California, require that trucks traveling on open roads be subject to having the webs of their wheels routinely examined for cracks in the vicinity of the lug nuts. The inspection requires removal of any wheel covers or retainers which are fitted under the lug nuts. The lug nuts of such large vehicles are generally tightened by pneumatic machines which are not available on the open road and, therefore, the inspection of truck wheels having covers attached by the lug nuts must be taken off the open road to a location where the lug nuts can be removed.

Wheel covers have also been attached to vehicle wheels by providing a retainer which is attached under the bolts retaining an oil cover across the distal end of the hub which extends through the center of the wheel. Such retainers, however, require that portions of the oil cover at the distal end of the hub be removed to attach the retainer. One such attachment is disclosed in my prior U.S. Pat. No. 5,358,313.

Besides the bolts retaining the oil cover to the axle hub and the lug nuts which retain the wheel to the axle, there are other functional elements to which a wheel cover can be attached. In my prior U.S. Pat. No. 5,823,635, I disclosed a method and apparatus whereby a wheel cover or wheel liner is attachable to a wheel having hand holes.

Although lug nuts are a standard functional element common to all wheels, not every wheel has hand holes. Wheels which mount tubeless tires, however, all have dropped centers between the open end of the wheel and the web of the wheel to facilitate attachment of the tire thereto. Since tires come in common sizes, wheels which retain liked-size tires have similar dropped centers. Accordingly, an attachment for retaining a wheel cover to a wheel which engages the dropped center thereof will be retainable to any wheel intended to receive a given size tire. It would, therefore, be beneficial to provide an attachment which utilizes the dropped center of a wheel to retain the cover thereto.

SUMMARY OF THE INVENTION

Briefly, the present invention is embodied in a cover for a vehicle wheel of the type having a generally tubular body with a first open end and a second end with a web having holes suitable for attachment to the hub of an axle, and a dropped center positioned midway between the first end and the second end of the wheel, the drop center forming an inner annular shoulder.

The cover for attachment thereto has a generally cylindrical body with an open end and a web end. The inner surface of the web end is adapted to fit against the web of the wheel, and a plurality of retainers are spaced around the inner surface of the web of the cover to retain the cover to the wheel. Each retainer includes a moveable hook having a first end, a second end and a central body extending from the first end to the second end. A guide on each of the retainers retains the hook oriented with the first end directed toward the axis of the wheel cover and the second end extending radially outward therefrom. Each hook is axially moveable with respect to the wheel cover with the movement of the central body of the hook being restricted by a U-shaped guide attached to the cover.

In the preferred embodiment, the U-shaped guide serves as a fulcrum around which the central body of a hook is pivotable. An adjustment bolt between the web of the wheel cover and the hook is used to axially move the central body of the hook with respect to the wheel cover. Rotation of the adjusting bolt in one direction brings the hook into engagement with the drop center of the wheel for retaining the wheel cover to the wheel and rotation the bolt in the opposite direction brings the hook out of engagement with the drop center, thereby releasing the cover from the wheel.

BRIEF DESCRIPTION OF THE DRAWINGS

A better understanding of the present invention will be had after a reading of the following detailed description taken in conjunction with the drawings, wherein.

DETAILED DESCRIPTION OF THE PREFERRED EMBODIMENT

Referring to FIGS. 1–5, a truck wheel 10 is configured to receive a given-sized tubeless truck tire 12. The wheel 10 has a generally tubular body 14 having an open end defined by a rim 16 and at the opposite end therefore is a web 18. The web 18 has a central opening 20 for fitting around the hub 22 of a truck axle and is retained to the axle by a plurality of studs, not visible, spaced around the hub 22 which extend through a plurality of complimentary holes 26 in the web 18 of the wheel 10 and are retained in place by lug nuts 28. The tubular portion 14 of the wheel 10 is contoured to receive the tire 12 and, accordingly, has a dropped center 30 which forms an inner annular shoulder 32.

Figure 5:
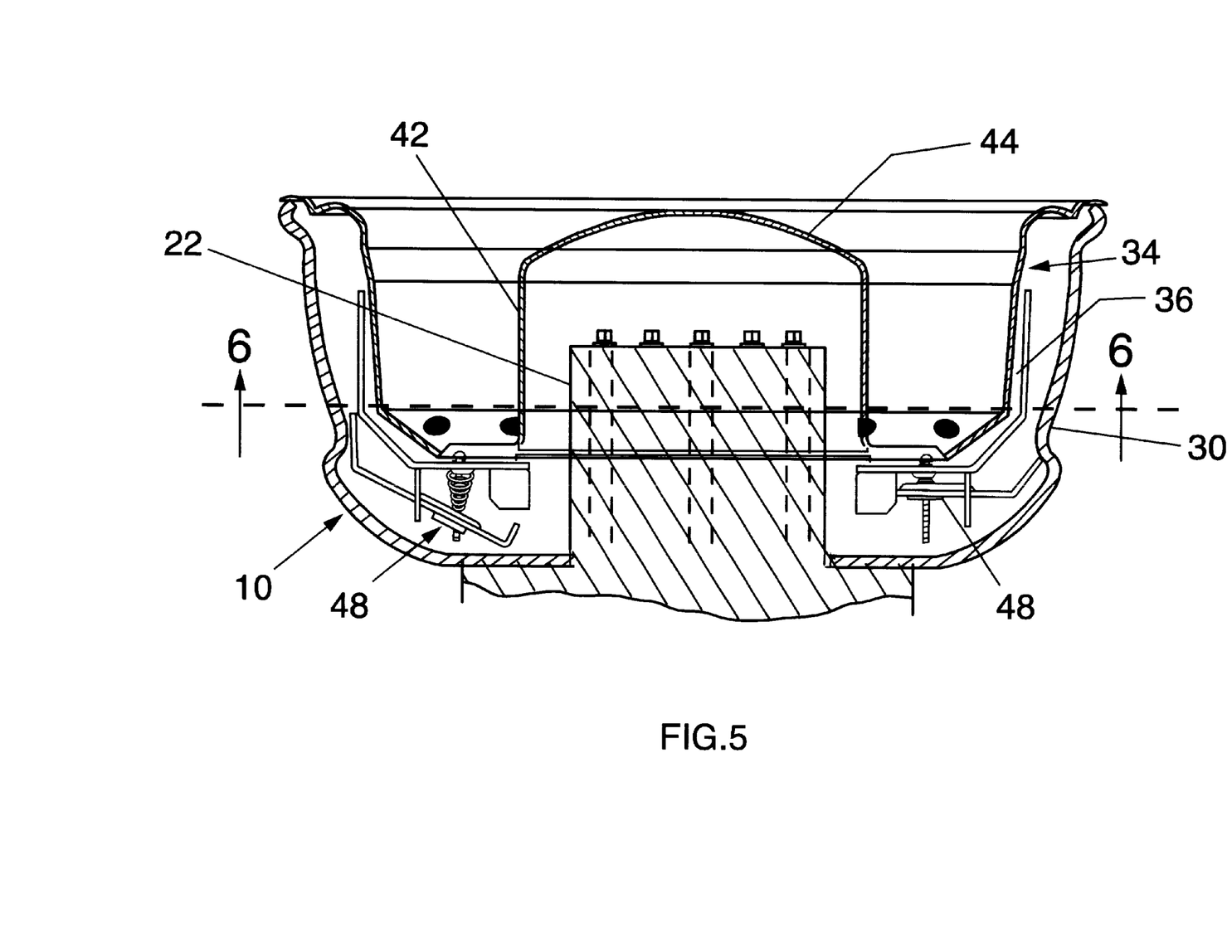
FIG. 5 is a cross sectional view of the wheel and cover assembled thereto taken through line 5—5 of FIG. 1 so as to show two retainers, one with the hook disengaged from the drop center such that the wheel cover can be removed from the wheel, and the other engaged with the shoulder of the drop center for retaining the wheel cover to the wheel.

Referring to FIGS. 1 and 3–6, fitted over the wheel 10 is a wheel cover 34 having a tubular body 36 sized to fit within the tubular body 14 of the wheel 10. The tubular body 36 has an axis 37, an open end defined by an annular rim 38 and a closed end defined by a web 40 shaped and sized to generally fit against the web 18 of the wheel as best shown in FIG. 5. Centrally located within the wheel cover 34 is a tubular high-hat 42 having a closed outer end 44 for surrounding the distal end of the hub 22. The appearance of the outer surface of the wheel cover 34 is enhanced by any suitable means such as buffing, polishing or coating with suitable materials such as chrome or the like. Spaced around the inner surface of the web 40 are a plurality of retainers 48 in accordance with the present invention for retaining the wheel cover 34 to the wheel 10.

Figure 1:
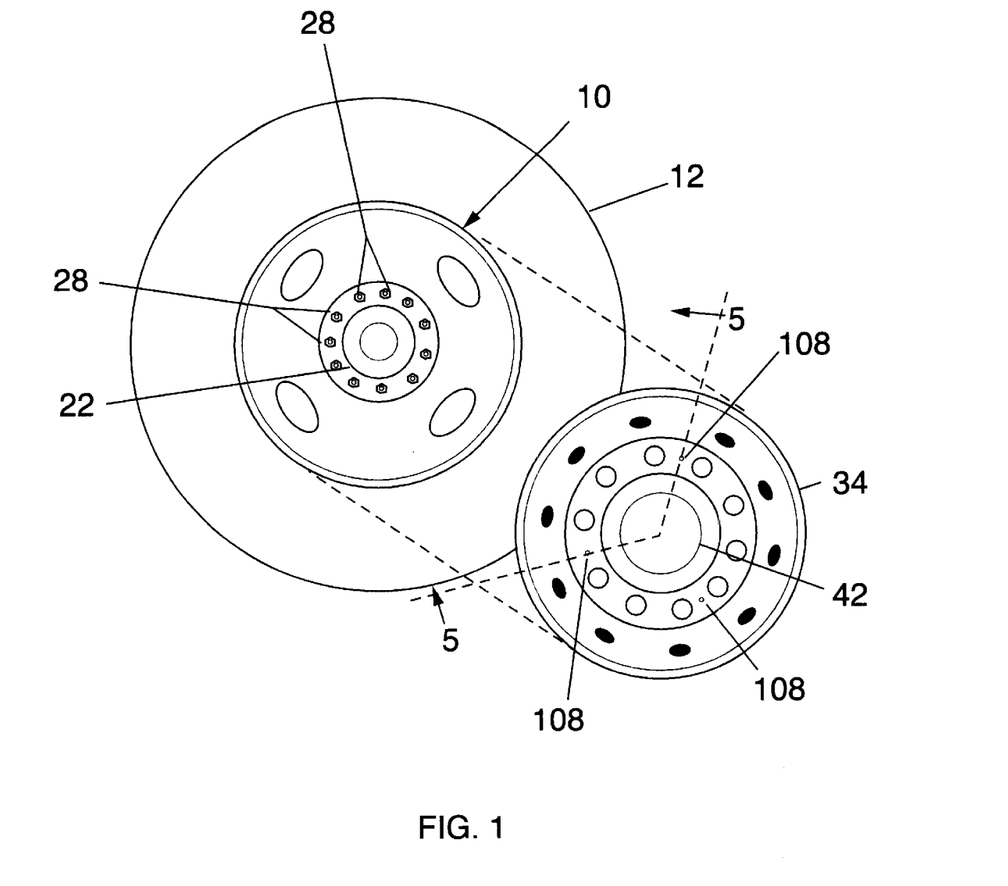
FIG. 1 is a front elevational view of a truck wheel and cover therefore with the cover exploded off of the wheel.
Figure 2:
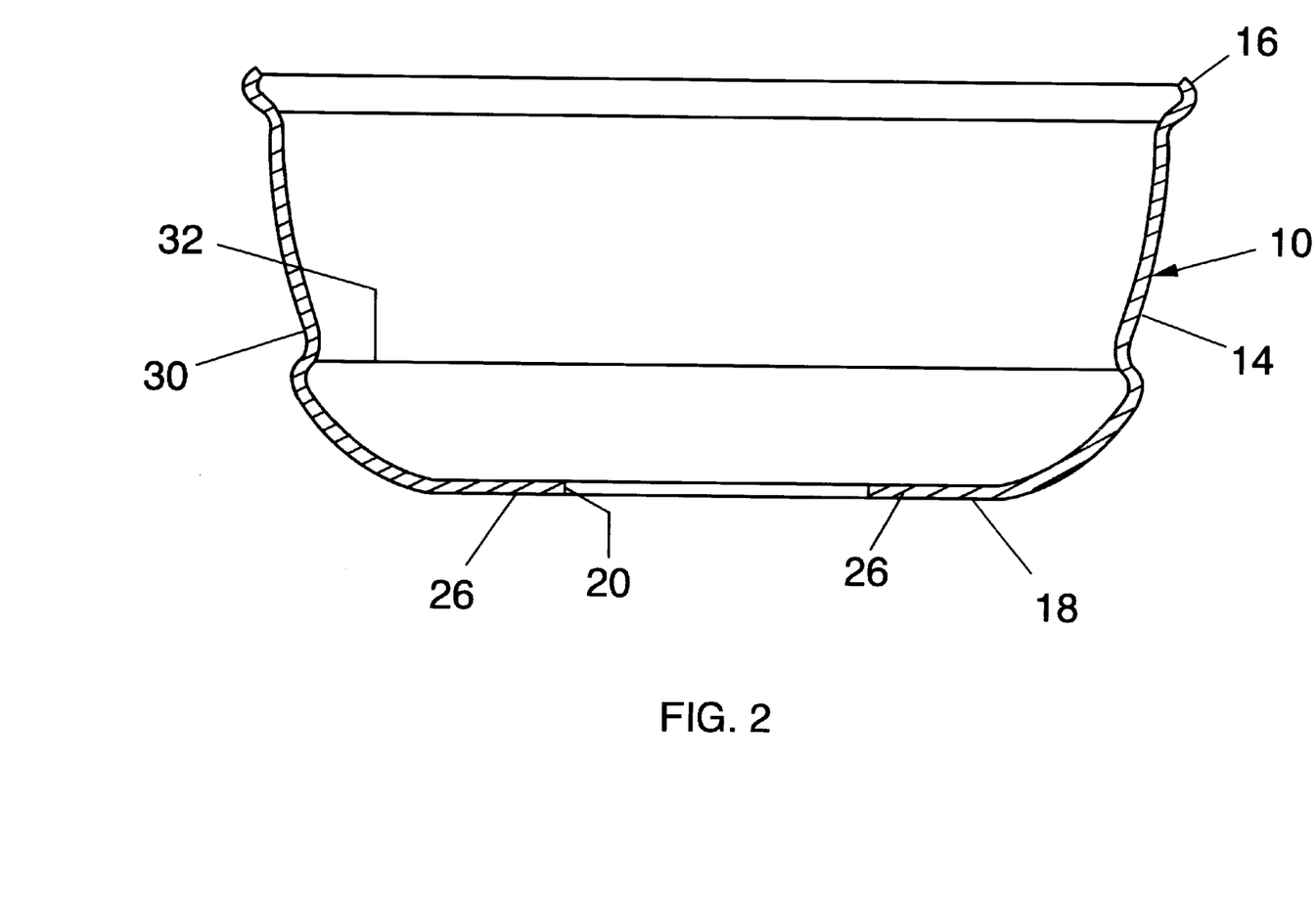
FIG. 2 is a cross sectional view of the wheel shown in FIG. 1 with the cover detached therefrom.
Figure 3:
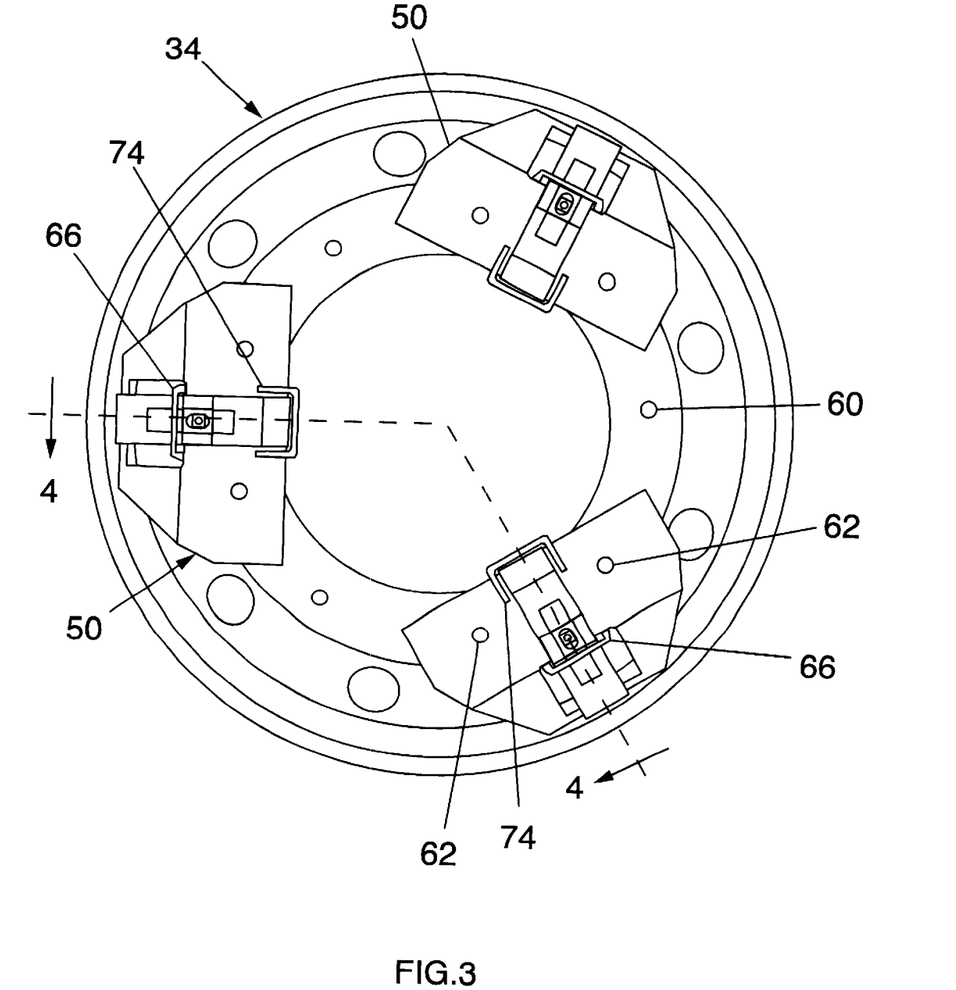
FIG. 3 is a rear elevational view of the cover shown in FIG. 1 for attachment to the wheel shown in FIG. 2.
Figure 4:
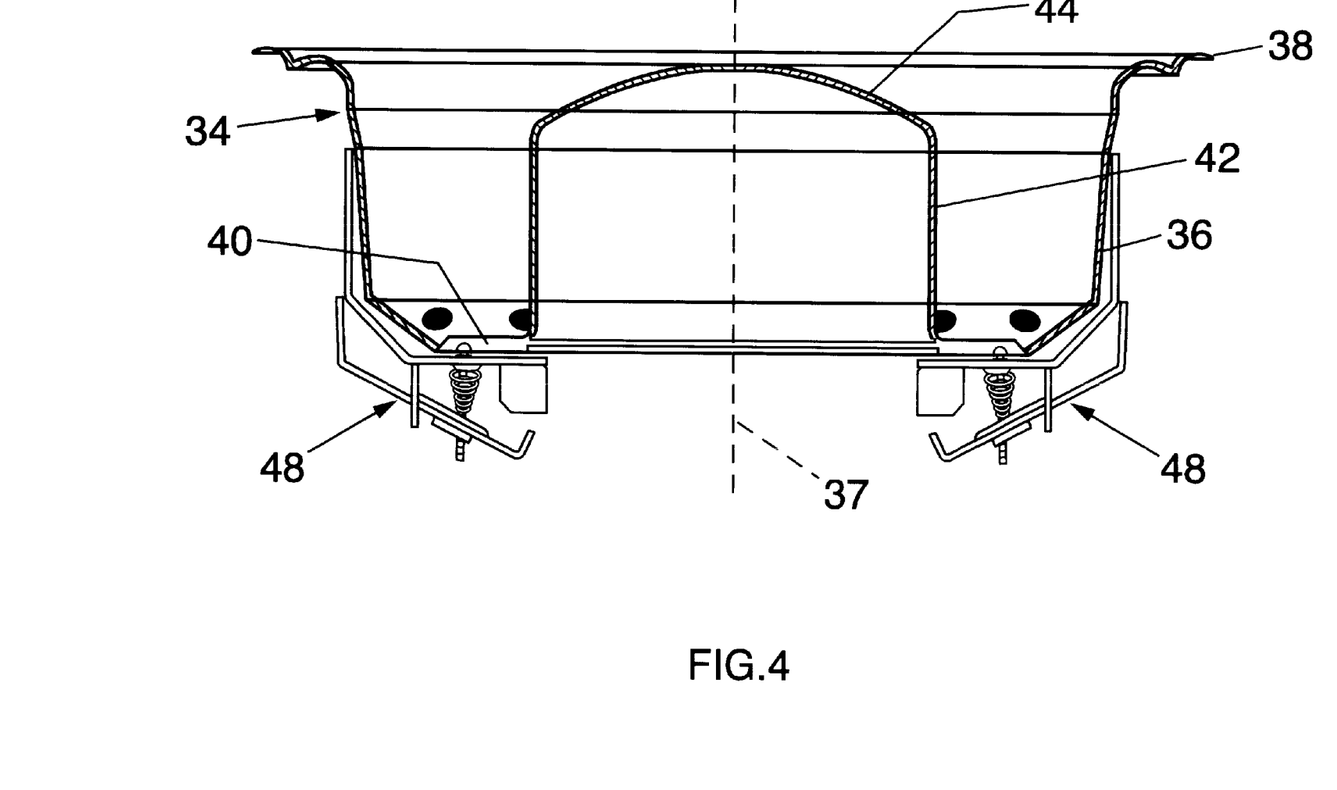
FIG. 4 is a cross sectional view of the cover shown in FIG. 3 taken through line 4—4 thereof.
Figure 6:
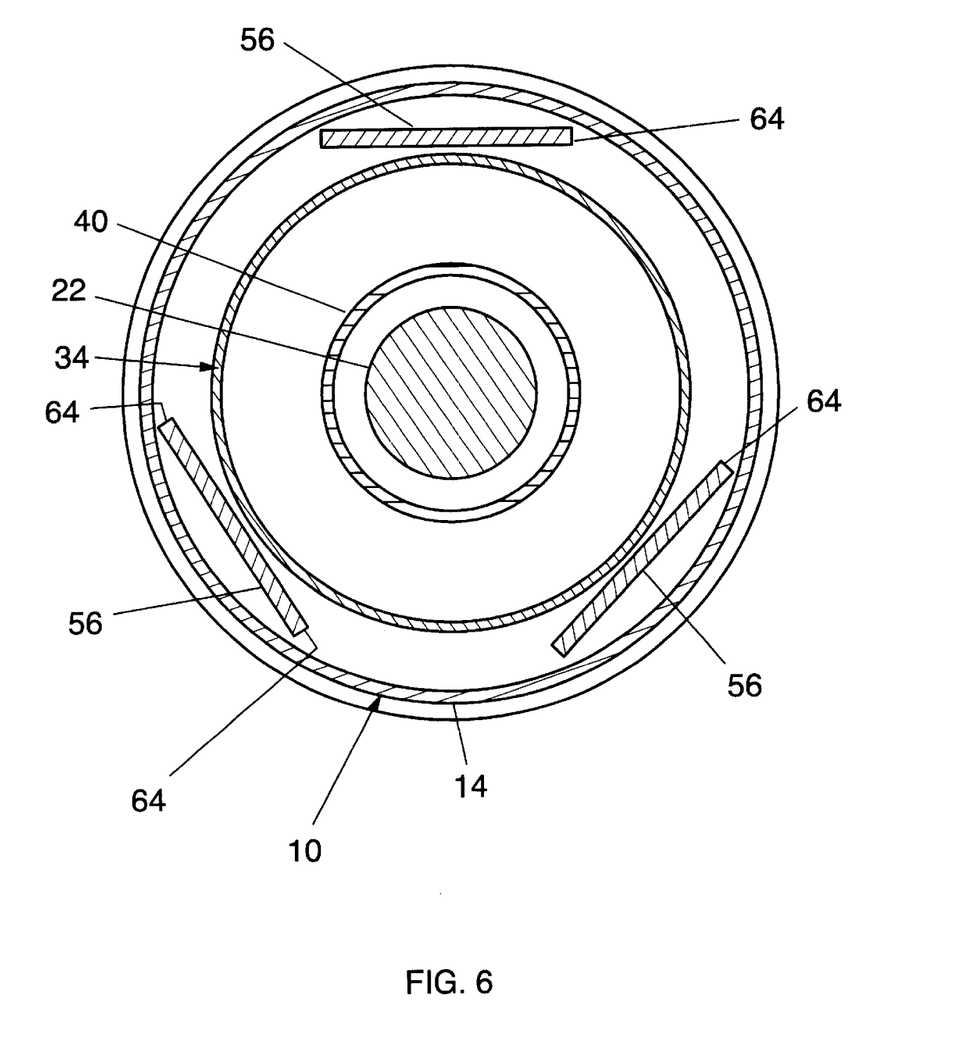
FIG. 6 is a cross sectional view of the wheel and cover shown in FIG. 5 taken through line 6—6 thereof.
Figure 7:
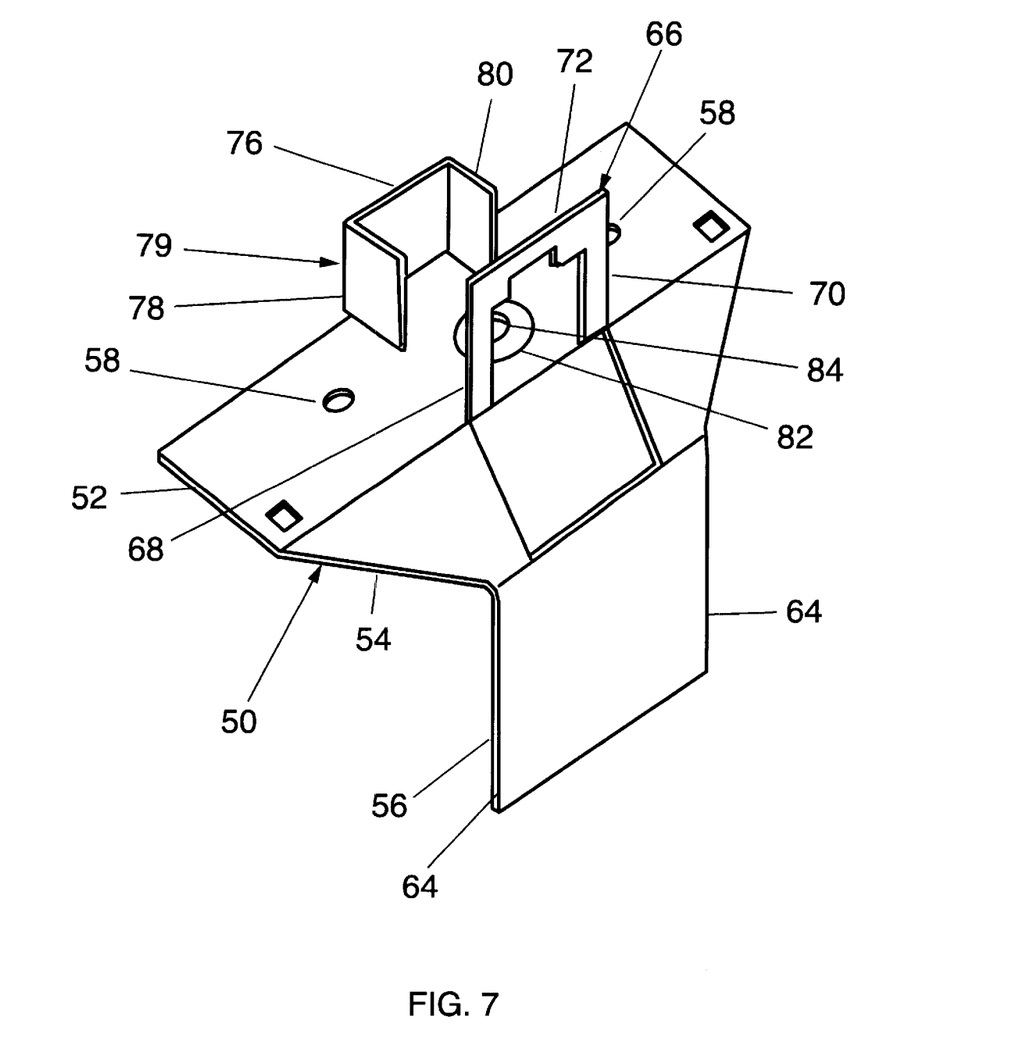
FIG. 7 is an enlarged isometric view of a mounting bracket and guide for use with the wheel cover shown in FIG. 4.

Referring to FIGS. 3 and 7, each retainer 48 has a mounting plate 50 and each mounting plate 50 has a mounting portion 52, a central portion 54 and a guide portion 56. The mounting portion 52 has a plurality of mounting holes 58 therein which are positioned to be complimentary to decorative holes 60 in the web 40 of the cover 34 and to be retained by bolts extending through the holes 58, 60 and retained by nuts 62 at the end thereof. The mid portion 54 of the mounting plate 50 is angled with respect to the mounting portion 52 to generally conform to the contouring of the transition between the web 40 and the tubular central body 36 of the wheel cover. The guide portion 56 extends from the central portion 54 and is angled at approximately ninety degrees with respect to the mounting portion 52 so as to extend substantially parallel to the axis 37. As best shown in FIG. 6, the outer edges 64 of the guide portions 56 define a cylinder having a diameter a little less than diameter of the tubular body 14 of the wheel 10 to facilitate the alignment of the wheel cover with respect to the wheel 10 as it is assembled thereto.

Referring further to FIG. 7, the mounting plate 50 further includes a rectangular shaped hook guide 66 extending rearwardly of the mounting portion 52, parallel to the axis 37 of the wheel cover 34. The hook guide has a generally rectangular window defined by sides 68, 70 and an outer end 72. Extending from mounting portion 52 opposite the hook guide 66 is a U-shaped boot 74 having a rearwardly extending back 76 and parallel rearwardly extending sides 78, 80. Between the hook guide 66 and the boot 70 is a rearwardly extending dimple 82 having a central hole 84 therein.

Figure 8:
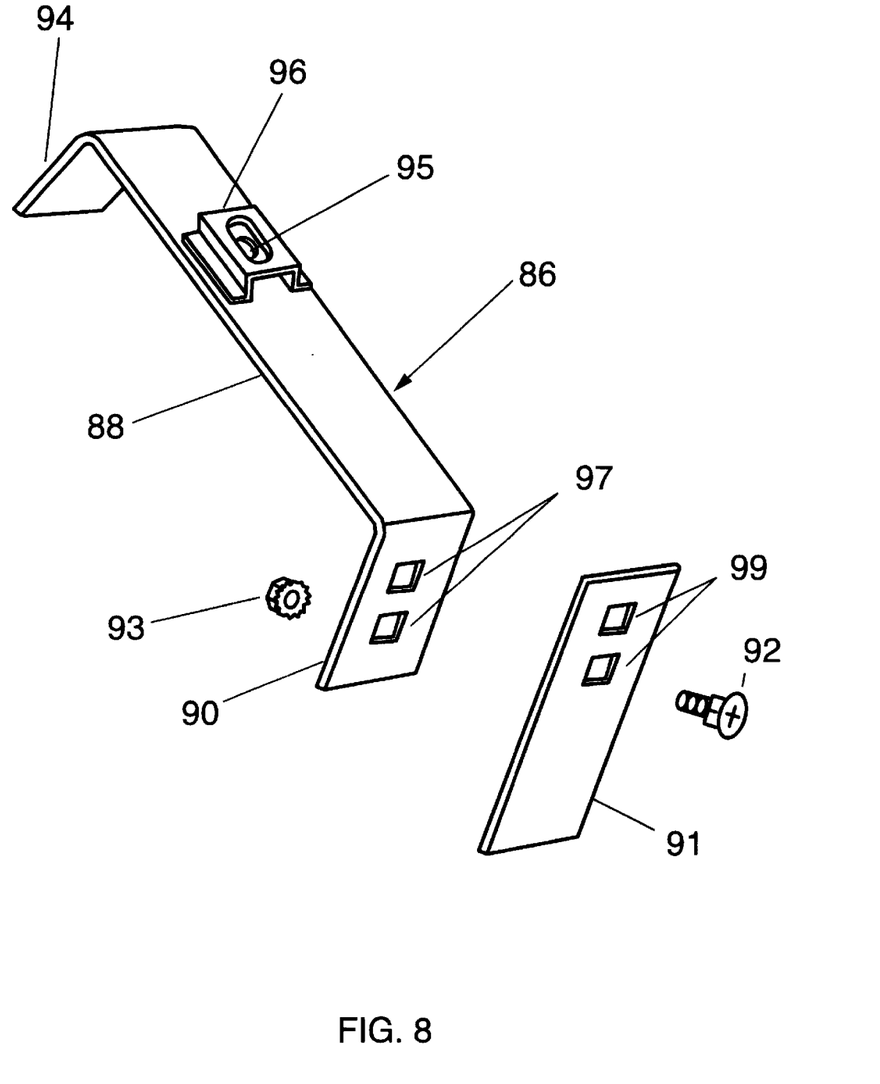
FIG. 8 is an enlarged isometric view of a hook which is retained on the mounting bracket shown in FIG. 7.

Referring to FIGS. 3, and 8, each attachment 48 further includes a moveable hook 86. Each hook 86 is preferably made of steel plate and has an elongate center arm 88, at one end of which is an angled hook end 90 and the opposite end from which is a perpendicularly oriented pivot end 94. Centrally located in the arm 88 is a hole 95 and behind the hole 95 is a box enclosure 96 for loosely capturing a nut as further described below. In the preferred embodiment the hook end 90 has an extension 91 atachable thereto by bolts 92 and nuts 93 extending through holes 97 and 99 in the hook end 90 and the extension 91 respectively. The extension 91 permits the length of the hook 90 to be longitudinally extendable so that the cover 34 can be attached to either of two different types of wheel configurations of the same diameter.

Referring to FIGS. 7, 8, 9a, 9b, 9c, and 10, the hook 86 is assembled to the retaining bracket 50 by a bolt 100 extending through the hole 84 in the dimple 82 and through a coil spring 102, through the hole 95 in the hook 86 and into a complimentary threaded nut 104 which is loosely captured in the enclosure 96 of the hook 86. The central portion of the arm 88 extends between the sides 68, 70 of the hook guide 66 such that movement of the hook 86 in a direction parallel to the axis 37 and towards the web 18 of the wheel 10 is limited by the outer end 72 thereof. Also, the pivot end 92 of the hook 86 is trapped between the sides 78, 80 of the boot 74 such that the boot 74 and hook guide 66 maintain the orientation of the hook 86 with the hook end 90 extending radially outward with respect to the axis 37.

Figure 10:
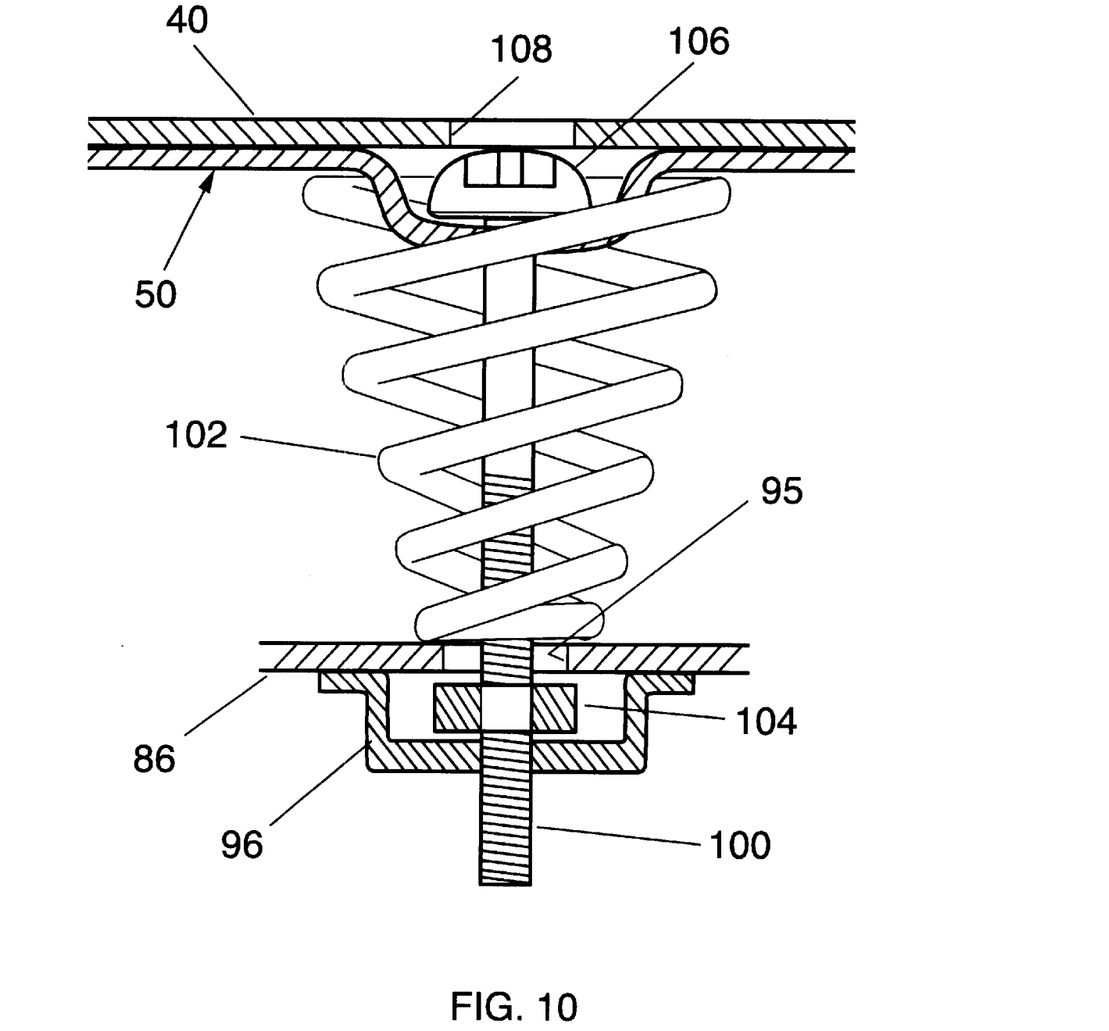
FIG. 10 is a further enlarged cross sectional view of the adjusting bolt the rotation of which changes the orientation of the hook with respect to the wheel cover.

Referring FIG. 10, the dimple 82 in the mounting plate 50 is sufficiently large to receive the entire head 106 of the bolt 100 such that the bolt 100 is rotatable even though the forward surface of the mounting plate 50 is secured to the rearward surface of the web 40 of the cover 34. A hole 108 is provided in the web 40 of the cover through which a screwdriver can be inserted to engage the head 106 of the bolt 100. It should be noted that the hole 108 has a diameter which is less than the diameter of the head 106 such that the head of the bolt is captured within the dimple by the rear surface of the web 40.

Figure 9A:
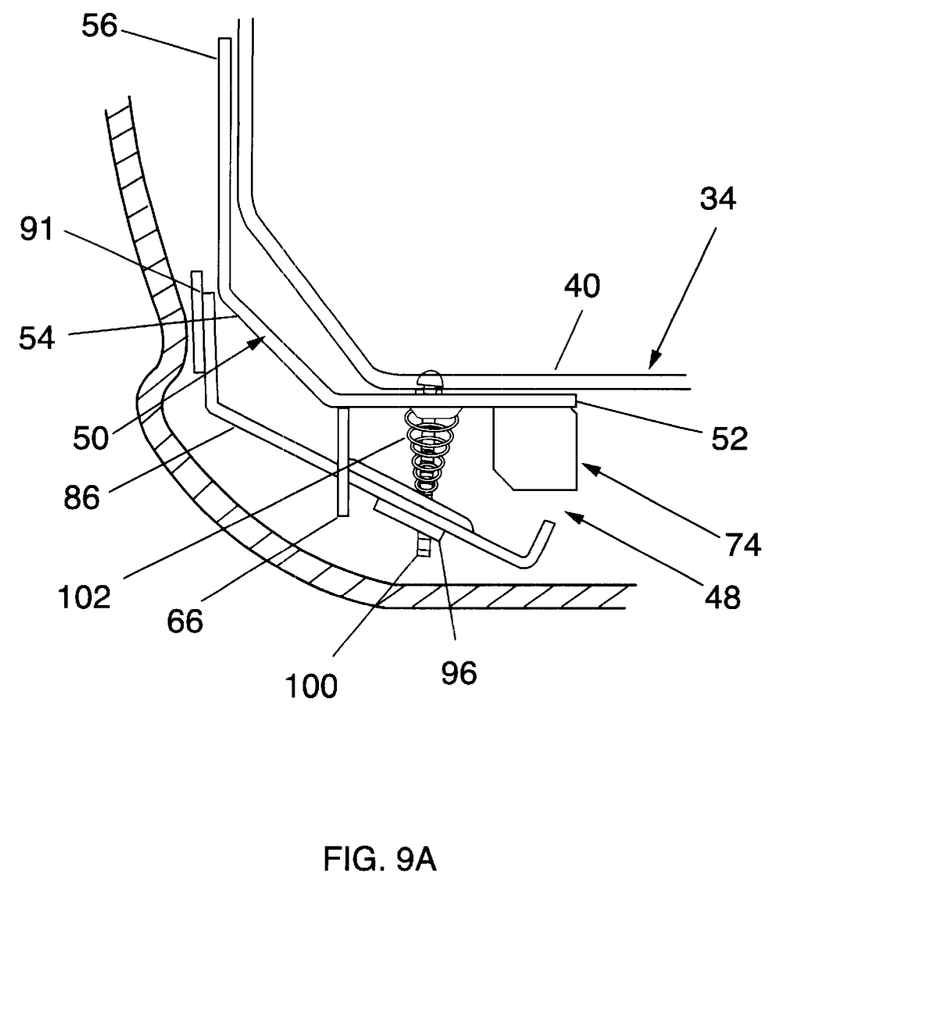
Fig. 9a is an enlarged cross sectional view of one of the retainers assembled to the wheel shown in FIG. 2 and showing the hook in the withdrawn orientation whereby the wheel cover shown in FIG. 4 can be installed into or removed from the wheel.

The coil spring 102 is biased to urge the hook away from the mounting plate 50. Accordingly, a screwdriver can be inserted through the hole 108 to rotate the bolt 100 and thereby urge the central portion of the hook parallel to the axis 37 through a plurality of positions shown in FIGS. 9a, 9b, and 9c. FIG. 9a depicts the bolt 100 adjusted with the nut 104 at the furthest extension thereof. When in this configuration, the hook 86 has been moved axially to its furthest rearward position. In this orientation, the central portion of the hook is abutting the outer end 72 of the hook guide 66 and has been pivoted around the outer end 72 until the pivot end 92 extends rearward and the hook end 90 is thrust against the outer surface of the guide portion 56 of the mounting plate 50. In this orientation, the hook end 90 will not contact the inner surface of the wheel 10, thereby permitting the wheel cover 34 to be inserted or withdrawn from the tubular body 14 of the wheel.

Figure 9B:
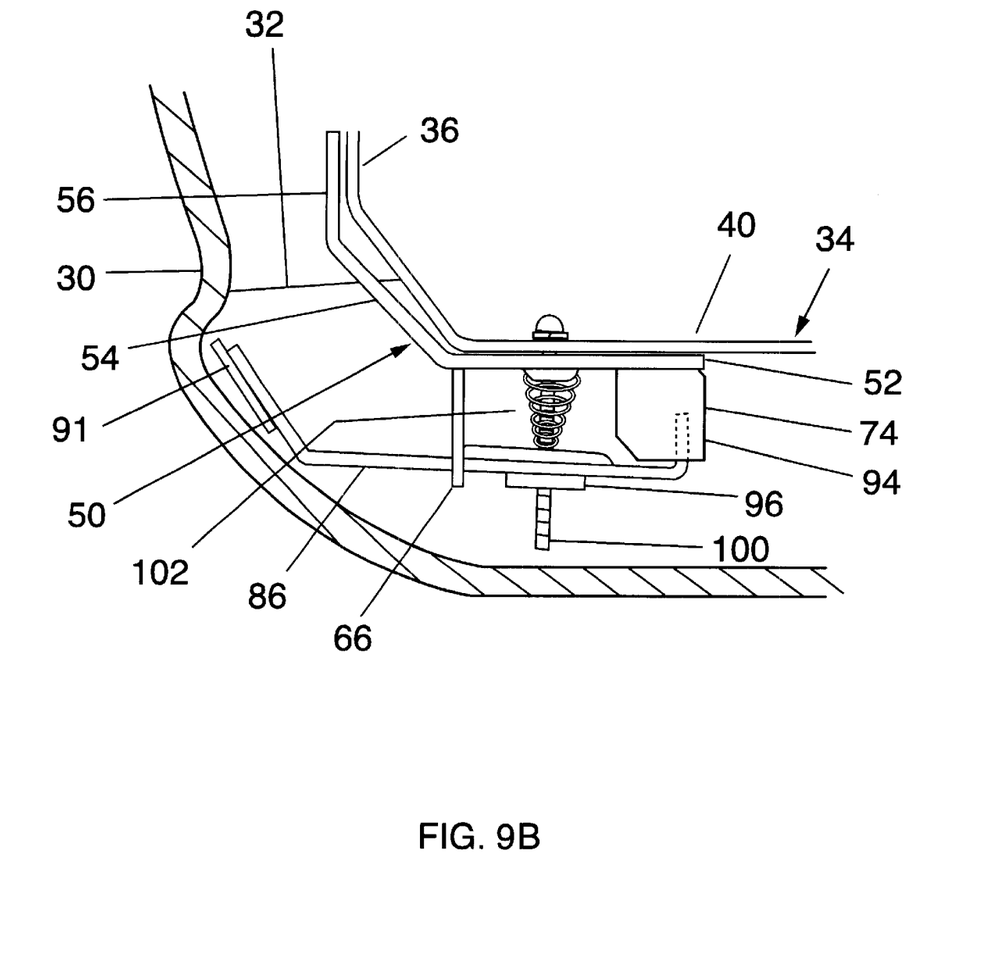
FIG. 9b is a second cross sectional view the retainer and wheel shown in FIG. 9a with the hook released from the retracted position and floating within the inner cavity of the wheel formed by the dropped center.

Referring to FIG. 9b, once the wheel cover 34 is inserted within the tubular body 14 of the wheel cover, as shown in FIG. 5, the bolt 100 can be rotated within the nut 104 to draw the nut downward along the length of the bolt. As the nut is drawn downward, the arm of the hook 86 will rotate within the outer end 72 of the hook guide 66 with the pivot end 92 moving towards the web 40 of wheel cover 34 and the hook end 90 swinging outwardly to the position shown in FIG. 9b. When in this orientation the hook end 90 floats within the cavity of the wheel formed behind the drop center 30.

Figure 9C:
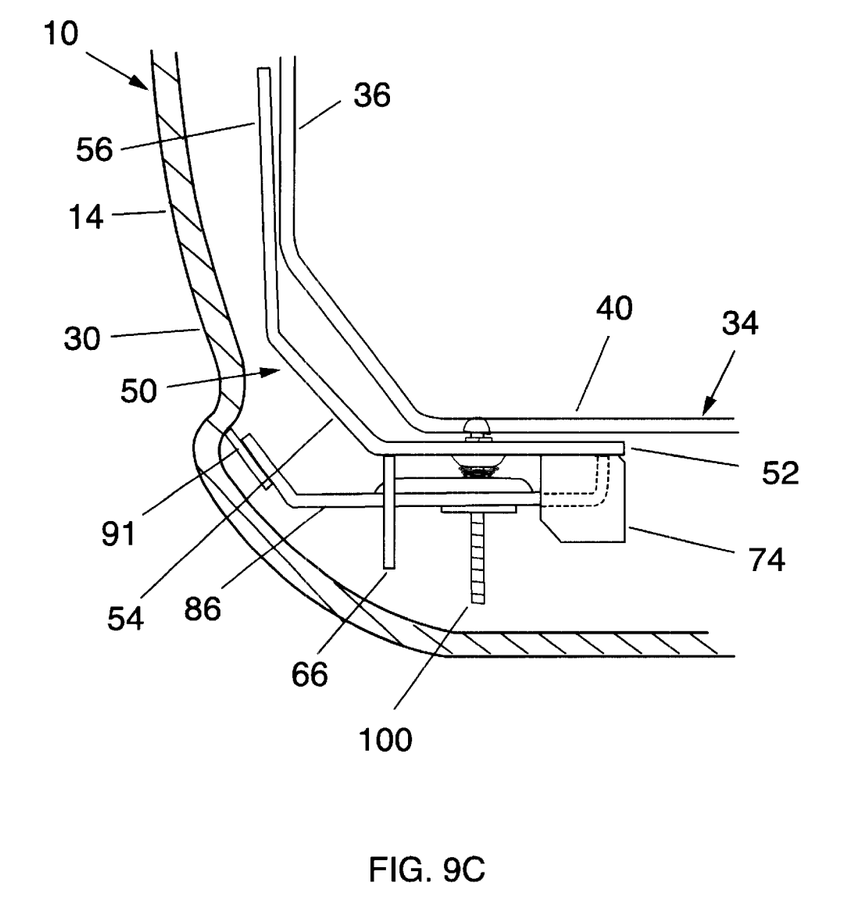
FIG. 9c is a third cross sectional view of the retainer and wheel shown in FIG. 9a with the hook wedged against the inner shoulder of the dropped center of the wheel for retaining the cover to the wheel.

As the rotation of the bolt 100 continues, the nut 104 is further drawn towards the head 106 thereof until the pivot end 92 of the hook 86 contacts the surface of the mounting plate 50. Further rotation of the bolt 100 will cause the hook 86 to pivot around the pivot end 92 and cause the hook end 90 to swing forward until it encounters the inner shoulder 32 of the dropped center 30 as shown in FIG. 9c. Further rotation of the bolt 100 tightens and locks the wheel cover 34 within the wheel 10.

When the wheel cover is removed, the bolt 100 is rotated in the opposite direction. Rotation of the bolt causes the nut 104 to move outward of the head 106 from the position shown in FIG. 9c towards the position in FIG. 9b. As it does so, the hook end 90 becomes disengaged from the inner shoulder 32 of the dropped center 30 and the hook 86 floats between the sides 68, 70 of the hook guide 66. With the continuing rotation of the bolt, the central arm 88 continues to move away from the mounting plate 50 until the outer surface thereof engages the outer end 72 of the hook guide 66, which is the position shown in FIG. 9b. Continued rotation of the bolt causes the hook 86 to pivot around the outer end 72 and causes the hook end 90 to swing inwardly until it abuts against the outer surface of the guide portion 56 which is the position shown in FIG. 9a.

As can be seen, there has therefore been disclosed an apparatus for retaining a wheel cover to a wheel employing a plurality of retainers 48, each of which has a hook 86 for engaging the inner shoulder 32 of a dropped center 30 of a wheel 10.

While the present invention is depicted with respect to a single embodiment, it will be appreciated that many modifications and variations can be made without departing from the true spirit and scope of the invention. It is, therefore, the intension of the appended claims to cover all such modifications and variations which fall within the true spirit and scope of the invention.

What is claimed:

1. A cover for a vehicle wheel of the type having a generally tubular body with a first open end, a second end with a web for attachment to the hub of an axle, a dropped center forming an inner shoulder, said dropped center and inner shoulder between said first end and said second end, said cover comprising a cover body shaped to cover at least a portion of said web of said wheel and having an axis of rotation, a retainer on said cover for retaining said cover to said wheel, moveable means on said retainer, said moveable means radially moveable with respect to said axis between a radially outward first position and a radially withdrawn second position, and said moveable means engaging said inner shoulder while in said first position for retaining said cover to said wheel and disengaged from said inner shoulder while in said second position whereby said cover is removable from said wheel.

2. The wheel cover of claim 1 wherein said moveable means is a hook having a hook end.

3. The cover of claim 1 wherein said cover has a generally cylindrical body defining a longitudinal axis, said cover further has an open end and a web end for fitting said web of said wheel, said moveable means is a rigid hook having a first end, a second end, an arm extending from said first end and to said second end, a guide for maintaining said hook oriented with said first end directed towards said axis and said second end extending radially outwardly of said axis, said first end and said second end of said hook axially moveable with respect to said cover, a first limit to limit axially movement of said hook away from said web of said cover, and an adjusting screw for adjusting movement of said hook towards and away from said limit.

4. The wheel cover of claim 2 and further comprising a bolt rotatable in a first direction to move said hook toward said first position and rotatable in a second direction to move said hook toward said second position.

5. The wheel cover of claim 4 and further comprising a guide for permitting axial movement of said hook, said guide extending around a central portion of said hook.

6. The wheel cover of claim 5 wherein said hook has a pivot end opposite said hook end, and said hook pivots around said pivot end as said hook is moved toward said first position and pivots around said guide as said hook is moved toward said second position.

7. A cover for a vehicle wheel of the type having a generally tubular body with a first open end, a second end with a web for attachment to the hub of an axle, a dropped center forming an inner shoulder, said dropped center and inner shoulder between said first end and said second end, said cover comprising a cover body shaped to cover at least a portion of said web of said wheel and having a longitudinal axis, a retainer on said cover for retaining said cover to said wheel, said retainer having means for engaging said shoulder for retaining said cover to said wheel.

8. The wheel cover of claim 7 wherein said means for engaging comprises a moveable hook.

9. A cover for a vehicle wheel of the type having a generally tubular body with a first open end, a second end with a web for attachment to the hub of an axle, a dropped center forming an inner shoulder, said dropped center and inner shoulder between said first end and said second end, said cover comprising a cover body shaped to cover at least a portion of said web of said wheel and having a longitudinal axis, a retainer on said cover for retaining said cover to said wheel, a moveable hook on said retainer for engaging said shoulder for retaining said cover to said wheel, and said hook having a first orientation in which said hook is withdrawn to said cover body, a second orientation in which said hook is engaged with said inner shoulder, and a third orientation between said first orientation and said second orientation in which said hook floats within a cavity behind said shoulder of said wheel.

10. The wheel cover of claim 9 wherein said retainer further includes a rotatable bolt and said hook is moved from said first orientation, through said third orientation to said second orientation by the rotation of said bolt.

11. A cover for a vehicle wheel of the type having a generally tubular body with a first open end, a second end with a web for attachment to the hub of an axle, a dropped center forming an inner shoulder, said dropped center and inner shoulder between said first end and said second end, said cover comprising     a cover body shaped to cover at least a portion of said web of said wheel and having an axis of rotation,     a retainer on said cover for retaining said cover to said wheel,     moveable means on said retainer for movement between a first position and a second position, and     said moveable means engaging said inner shoulder while in said first position for retaining said cover to said wheel and disengaged from said inner shoulder while in said second position whereby said cover is removable from said wheel.

* * * * *